United States Patent [19]

Komatsu et al.

[11] Patent Number: 5,066,404

[45] Date of Patent: Nov. 19, 1991

[54] METHOD FOR SEPARATING SODIUM AND POTASSIUM BY ION EXCHANGE

[75] Inventors: Yu Komatsu; Yoshinori Fujiki; Takayoshi Sasaki, all of Tsukuba, Japan

[73] Assignee: National Institute for Research in Inorganic Materials, Tsukuba, Japan

[21] Appl. No.: 578,415

[22] Filed: Sep. 7, 1990

[30] Foreign Application Priority Data

Jan. 5, 1990 [JP] Japan .......................................... 2-883

[51] Int. Cl.$^5$ ............................................. B01D 15/04
[52] U.S. Cl. .................................... 210/670; 210/681; 423/181
[58] Field of Search ................. 210/670, 681; 423/181

[56] References Cited

U.S. PATENT DOCUMENTS 3,522,187  7/1970  Kraus .................................. 210/681
3,598,548  8/1971  Grinstead ............................ 423/181

Primary Examiner—Ivars Cintins
Attorney, Agent, or Firm—Oblon, Spivak, McClelland, Maier & Neustadt

[57] ABSTRACT

A method for separating sodium and potassium from an aqueous solution containing such metals, which comprises selectively ion-exchanging sodium and potassium with titania hydrate ($TiO_2 \cdot nH_2O$ where $n=1$ to 2) obtained by treating potassium titanate to remove potassium therefrom, followed by a reaction at a temperature of from 25° to 80° C. to desorb and purify sodium and potassium.

2 Claims, No Drawings

METHOD FOR SEPARATING SODIUM AND POTASSIUM BY ION EXCHANGE

BACKGROUND OF THE INVENTION

1. Field of the Invention

The present invention relates to a method for ion-exchanging and separating sodium and potassium, which is suitable for use, for example, as a method for selectively recovering potassium ions in sea water, whereby potassium can be efficiently recovered from sea water containing a large amount of sodium (0.6 mol).

2. Discussion of Background

Heretofore, separation among alkali metals has been successful in a case where lithium is separated by means of antimonic acid, or cesium is separated by means of titanic acid, by utilizing the difference in ionic radius. On the other hand, no satisfactory results have been obtained in the separation of adjacent sodium and potassium.

Therefore, as a method for recovering potassium from sea water containing a large amount of sodium (0.6 mol), it has been common to employ a method wherein chlorides of metals (including potassium) dissolved in sea water are all collected and then their separation is conducted by means of an organic ion exchange resin, etc. to recover potassium.

However, this method is not designed to directly and selectively recover potassium from sea water and has a problem that it is thereby difficult to obtain potassium in high purity.

SUMMARY OF THE INVENTION

It is an object of the present invention to overcome such drawbacks of the prior art and to provide a method whereby sodium and potassium can be separated and recovered efficiently and in high purity by means of ion exchange separation.

To accomplish the above object, the present inventors have conducted an extensive research for an ion exchanging substance which is capable of efficiently separating sodium and potassium and as a result, have accomplished the present invention.

Namely, the present invention provides a method for separating sodium and potassium from an aqueous solution containing such metals, which comprises selectively ion-exchanging sodium and potassium with titania hydrate ($TiO_2 \cdot nH_2O$ where $n=1$ to 2) obtained by treating potassium titanate to remove potassium therefrom, followed by a reaction at a temperature of from 25° to 80° C. to desorb and purify sodium and potassium.

DETAILED DESCRIPTION OF THE PREFERRED EMBODIMENTS

Now, the present invention will be described in detail.

The present inventors have found that titania hydrate ($TiO_2 \cdot nH_2O$ where $n=0.5$ to 2) obtained by firstly preparing fibrous potassium titanate $K_2O \cdot nTiO_2$ where $n=1$ to 5 from a melt of a mixture of starting materials for potassium titanate comprising $TiO_2$, $K_2O$ and $K_2MoO_4$ (here, $K_2MoO_4$ is added to make the resulting potassium titanate fibrous), and then subjecting the fibrous potassium titanate to potassium-removal treatment, swells upon absorption of water, and by virtue of this swelling characteristic, it is capable of constantly ion-exchanging ions having ionic radii larger than the ionic radius of a hydrogen ion, such as potassium ions.

As a result of a further research, it has been found that this ion-exchanging ability does not decrease even at a high temperature, and among alkali metal ions, no decrease was observed also with respect to the separating ability. The present invention has been accomplished on the basis of these discoveries.

Potassium titanate ($K_2O \cdot nTiO_2$ where $n=1$ to 5) to be used in the present invention is obtained by melting and then cooling a mixture of starting materials containing at least $TiO_2$ and $K_2O$ or $K_2CO_3$. This potassium titanate, if crystalline, may be in a powder form, a granular form or a fibrous form. From the viewpoint of handling efficiency, a fibrous form is preferred. To make the material fibrous, $K_2MoO_4$ is added to the starting materials.

Such potassium titanate is subjected to potassium-removal treatment to obtain titania hydrate ($TiO_2 \cdot nH_2O$ where $n=1$ to 2). When ion exchanged with sodium and potassium, this titania hydrate is converted to sodium titanate ($Na_2O \cdot nTiO_2 \cdot mH_2O$) and potassium titanate ($K_2O \cdot nTiO_2 \cdot mH_2O$). The amount of the ion exchange varies depending upon the concentrations of sodium and potassium, the reaction time, the reaction temperature, etc.

This titania hydrate undergoes a structural change from a layered structure to an anatase structure at a high temperature (from 100° to 500° C.). However, within a temperature range of from 25° to 80° C., the layered structure is maintained, and it is possible to reuse it. Besides, it has a swelling characteristics such that it swells upon absorption of water, whereby with respect to potassium and sodium having ionic radii larger than that of a hydrogen ion, no deterioration in the ion exchange separating ability is observed even when the temperature is raised. Whereas, in the case of an alkaline earth metal, the ion exchange separating ability lowers as the temperature rises.

During the reaction, if the system is made weakly acidic, only sodium ions may be eluted into the aqueous solution, and by raising the acidity, potassium ions may also be recovered.

For example, to recover sodium and potassium from sea water, firstly sodium and potassium are simultaneously ion exchanged since the pH of sea water is about 8, whereby potassium is already concentrated to some extent, and by controlling the pH at the time of desorption, it is possible to selectively desorb only sodium. Further, separation of alkaline earth metal ions having a reaction temperature dependency for desorption can readily be conducted by selecting the temperature. Thus, the separation can be conducted effectively to obtain pure metals.

Now, the present invention will be described in further detail with reference to Examples. However, it should be understood that the present invention is by no means restricted to such specific Examples.

EXAMPLES

Firstly, powders of $TiO_2$, $K_2CO_3$ and $K_2MoO_4$ were mixed in a molar ratio of 3:1:7. Then, 45 g of this mixture was put into a platinum crucible, and it was heated to 1,150° C. and melted and then cooled to 950° C. at a rate of 4° C./h to let it crystallize in a fibrous form. The fibrous crystals thus obtained were packed into a column, and about 10l of water was passed therethrough to remove $K_2MoO_4$.

Further, about 10l of 1M hydrochloric acid was passed therethrough (1l/day) for potassium-removal treatment, and excess hydrochloric acid was removed by washing with water.

The fibers thus obtained had a composition of titania hydrate ($TiO_2 \cdot nH_2O$, where n=0.5 to 2) and were in the form of a bundle having a diameter of 0.01 mm and had an average length of 1 mm.

Then, an aqueous solution containing $1 \times 10^{-5}$ mol of sodium or potassium and 0.1 g of the above titania hydrate fibers were subjected to an ion exchange reaction within a temperature range from 25° to 80° C.

In such a case, within the temperature range of from 25° to 80° C., the titania hydrate fibers were immersed in an amount of 0.1 g per 10 ml of a $1 \times 10^{-3}$ M NaCl or KCl aqueous solution, for three days and gently manually stirred every day. After the reaction, the reaction solution was subjected to solid-liquid separation, and concentrations of sodium and potassium in the aqueous solution were measured by an atomic absorption method, whereupon the concentrations in both phases were calculated. The results are shown in Table 1.

It is evident from Table 1 that by controlling the pH, sodium and potassium can be separated at high efficiency. Even within a temperature region above 60° C. where the conventional ion exchange resins are useless, the titania hydrate of the present invention exhibits an ion exchanging ability substantially equal to the level at 25° C.

TABLE 1

| Reaction temp. | pH for the reaction | Ratio of the amount of ion-exchanged metal to the amount of metal in the aqueous solution | |
|---|---|---|---|
| | | Sodium | Potassium |
| 25° C. | 2 | 0.050 | 5.01 |
| 25° C. | 3 | 0.501 | 50.12 |
| 25° C. | 4 | 5.012 | 501.19 |
| 40° C. | 2 | 0.047 | 6.31 |
| 40° C. | 3 | 0.468 | 63.10 |
| 40° C. | 4 | 4.677 | 630.96 |
| 60° C. | 2 | 0.054 | 6.92 |
| 60° C. | 3 | 0.537 | 69.18 |
| 60° C. | 4 | 5.371 | 691.83 |
| 80° C. | 2 | 0.051 | 4.47 |
| 80° C. | 3 | 0.513 | 44.67 |
| 80° C. | 4 | 5.129 | 446.69 |

Note:
The numerical values in the columns for sodium and potassium represent a ratio of the molar amount of the ion-exchanged metal to the molar amount of the metal in the aqueous solution.

As described in detail in the foregoing, according to the present invention, ion exchange is conducted by means of titania hydrate and desorption is conducted by the reaction at a temperature of from 25° to 80° C., whereby sodium and potassium can be recovered efficiently in high purity from an aqueous solution containing sodium and potassium. Besides, the titania hydrate can be reused.

What is claimed is:

1. A method for separating sodium and potassium ions from an aqueous solution containing ions of these metals, which comprises selectively ion-exchanging sodium and potassium ions with fibrous crystal titania hydrate having the formula $TiO_2 \cdot nH_2O$ where n=0.5 to 2 obtained by subjecting potassium titanate to a potassium-removal treatment, followed by an ion exchange reaction at a temperature of from 25° to 80° C. to desorb and purify sodium and potassium ions.

2. The method according to claim 1, wherein said potassium titanate is obtained by melting and then cooling a mixture of starting materials comprising at least $TiO_2$ and $K_2O$ or $K_2CO_3$.

* * * * *